Figure 1:
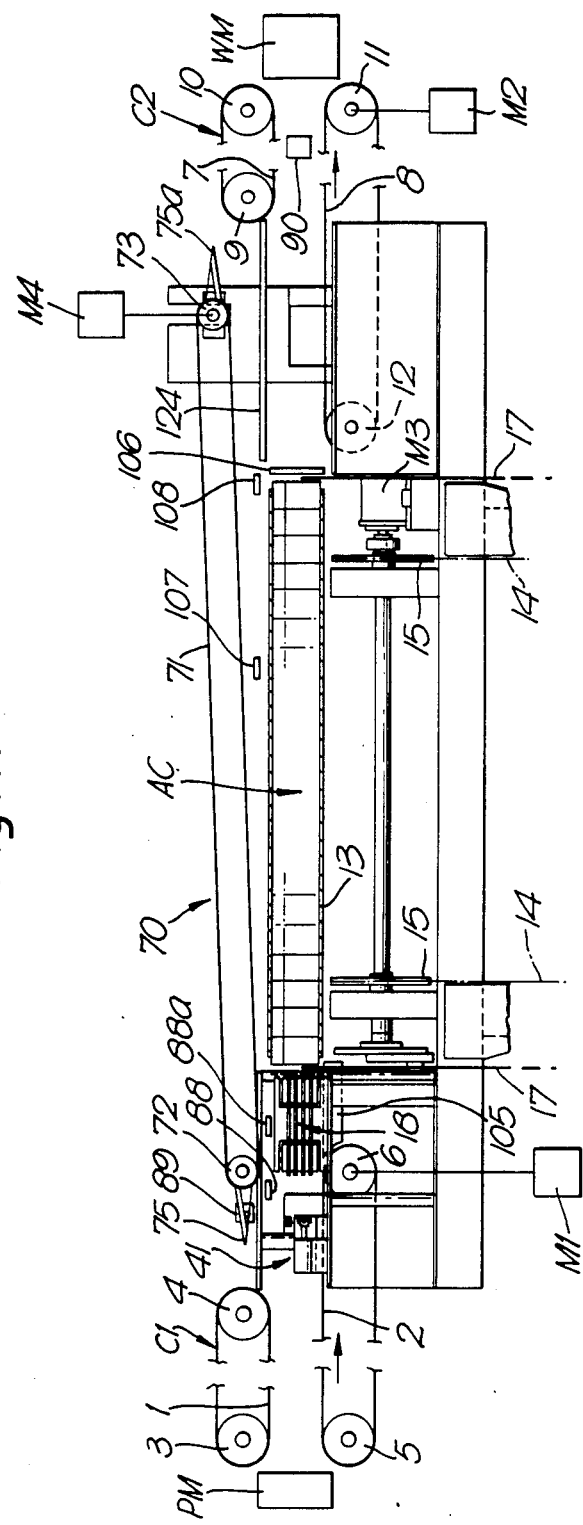

United States Patent [19]

Gayfer et al.

[11] Patent Number: 4,690,265
[45] Date of Patent: Sep. 1, 1987

[54] PACKET HANDLING APPARATUS

[75] Inventors: David Gayfer; Stanley V. Starkey; John G. Wareham, all of London, England

[73] Assignee: Molins PLC, London, Great Britain

[21] Appl. No.: 639,358

[22] Filed: Aug. 10, 1984

[30] Foreign Application Priority Data

Aug. 11, 1983 [GB] United Kingdom ............... 8321675

[51] Int. Cl.$^4$ .............................................. B65G 47/57
[52] U.S. Cl. ................................... 198/347; 198/425; 198/627
[58] Field of Search .................. 198/347, 425–430, 198/627, 628, 836, 364, 365, 366, 368, 370, 371, 573, 575, 620

[56] References Cited

U.S. PATENT DOCUMENTS

| | | | |
|---|---|---|---|
| 3,224,556 | 12/1965 | Stram | 198/425 X |
| 3,237,365 | 3/1966 | Koulafuff et al. | 198/425 X |
| 3,260,354 | 7/1966 | Chiddister et al. | 198/628 X |
| 3,342,350 | 9/1967 | Seragnoli | 198/347 X |
| 3,499,555 | 3/1970 | Wahle | 198/347 |
| 3,762,582 | 10/1973 | Barnhart et al. | 198/347 X |
| 3,951,257 | 4/1976 | Storace et al. | 198/628 |
| 4,132,305 | 1/1979 | Mastak | 198/425 X |
| 4,274,530 | 6/1981 | Carter et al. | 198/347 |
| 4,499,987 | 2/1985 | Long | 198/347 |
| 4,549,662 | 10/1985 | Schoenig, Jr. et al. | 198/425 X |

FOREIGN PATENT DOCUMENTS 2025347 1/1980 United Kingdom .
2097744 11/1982 United Kingdom .

Primary Examiner—Robert J. Spar
Assistant Examiner—Lyle Kimms
Attorney, Agent, or Firm—Antonelli, Terry & Wands

[57] ABSTRACT

A system for conveying cigarette packets includes a reversible compartmented accumulator (AC) arranged so that in normal operation packets are pushed by retractable pressure bands (18) through an aligned uppermost compartment (13) during passage from a packing machine (PM) to a wrapping machine (WM). To load the accumulator (AC) packets are stopped at the downstream end by a gate (106) so as to assemble a batch of packets in the aligned compartment (13) for storage by transverse indexing of the accumulator (AC). As part of the loading sequence detectors (88, 107) determine the presence of a complete batch of packets at least partly upstream of the compartment (13). Before the loading sequence begins the uppermost compartment (13) is emptied of packets by an unloading conveyor (70). To unload the accumulator (AC) the infeed of packets is stopped and the unloading conveyor (70) removes packets from successive compartments (13) indexed into the aligned position.

27 Claims, 9 Drawing Figures

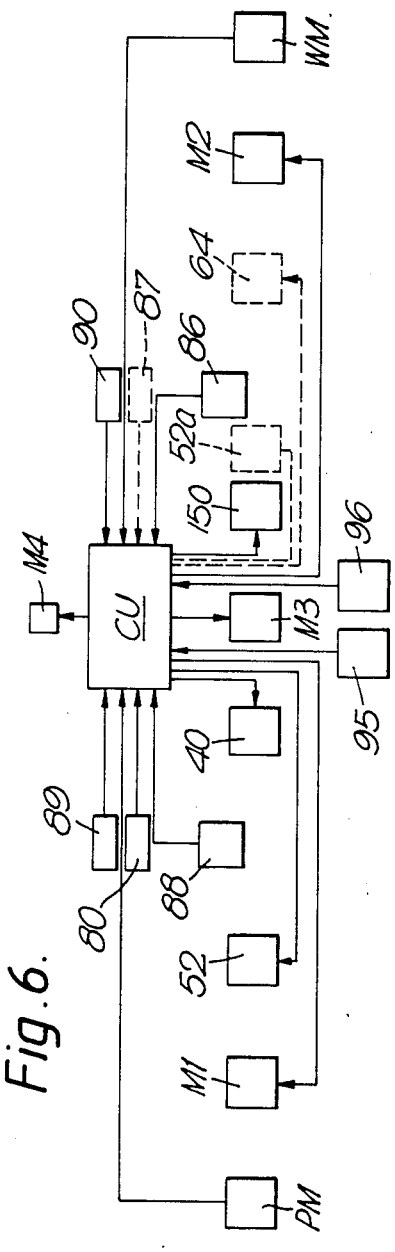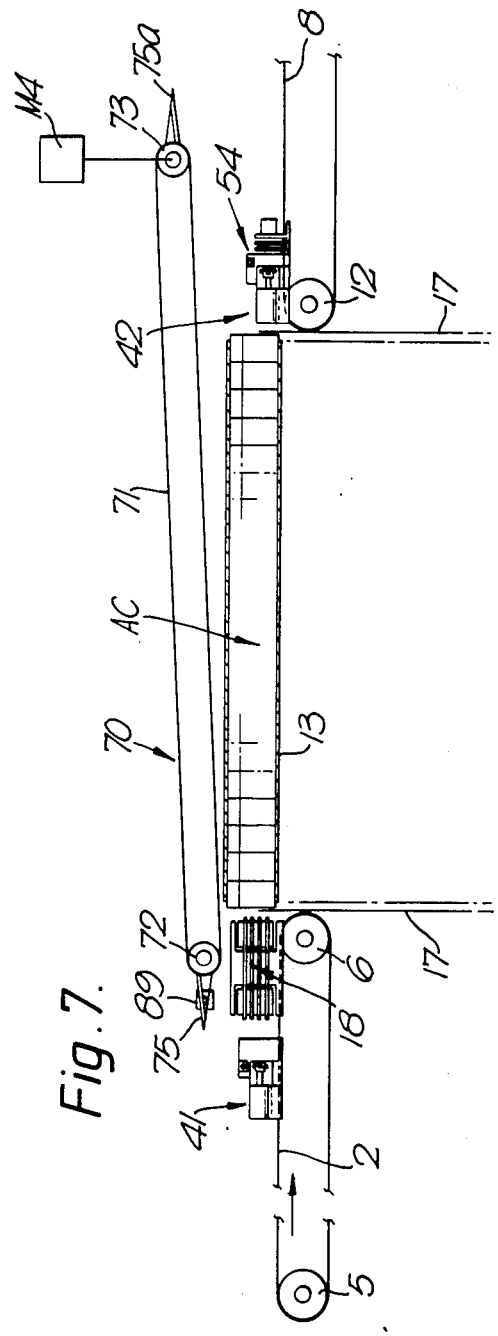

PACKET HANDLING APPARATUS

This invention concerns improvements in or relating to handling apparatus for packets such as those used for packaging cigarettes.

It is common in the cigarette industry to link machines which carry out different operations on cigarettes (e.g. a cigarette packing machine and a packet wrapping machine) by means of conveyors by which the packets are fed in line. Where the operating speed of the machines differs, an accumulator may be included in the conveyor system to temporarily store packets or feed them from the store to the downstream machine. One form of such packet handling apparatus is disclosed in British patent specification No. 2025347B. The present invention is particularly, but not exclusively, intended for use with apparatus of this type.

According to the present invention there is provided packet handling apparatus comprising an accumulator having a plurality of compartments for receiving and storing batches of packets, means defining a delivery path on which packets are moved towards said accumulator, reversible drive means for moving successive compartments into a transfer position in alignment with said delivery path, means defining a receiving path on which packets are moved away from the accumulator, first and second conveying means for conveying packets along at least part of the delivery path and through a compartment at the transfer position, and control means for selectively operating one of the first and second conveying means according to the operating condition of the accumulator. The first conveying means may be operable to move packets into a compartment to form a batch for storage in the accumulator. The second conveying means may be operable to remove a batch of packets from a compartment during unloading of the accumulator. The control means may include means for operating said second conveying means to remove packets from a compartment prior to operation of the first conveying means to move packets into a compartment at the beginning of a transfer sequence for loading packets into the accumulator. The second conveying means may therefore comprise an unloading conveyor, e.g. having at least one pusher, normally used to remove packets from a compartment for delivery to the receiving path but also used to clear a compartment prior to its receiving a batch of packets delivered from the delivery path by the first conveying means when it is required to load packets into the accumulator. By clearing a compartment in this way at the beginning of a loading sequence it is possible to ensure that detector means provided to initiate indexing of a compartment when a batch of packets is correctly assembled does not respond to a false signal which may otherwise occur due to presence of packets moved into the compartment prior to initiation of the loading sequence.

The second conveying means may include at least one pusher movable through a compartment at the transfer position. The apparatus may include gate means for stopping packets in the transfer position prior to operation of the drive means to move a loaded compartment from the transfer position into a storage position. The control means may include means for operating said second conveying means to remove packets from the compartment prior to operation of the gate means to assemble a batch of packets for loading into the accumulator. The first conveying means may include means for driving packets into and through a compartment at the transfer position, wherein said packet driving means includes at least one conveyor and means for pressing packets onto said conveyor to more positively engage the packets, and means for releasing said pressing means at times other than when it is required to drive packets through a compartment at the transfer position. The packet drive means may comprise opposed conveyors which include a plurality of parallel spaced bands arranged on each side of a packet and a low friction pressure member in engagement with the bands on at least one side.

A further gate means may be positioned upstream of the packet driving means and means may be provided for operating said further gate means to prevent further feeding of packets towards the accumulator during operation of the reversible drive means. Preferably the apparatus further includes detector means arranged to detect when a complete batch of packets is contained in a compartment at the transfer position. The apparatus may still further include means for stopping or rendering inoperative the first conveying means following a signal from the detector means. The detector means may comprise a first detector consisting of spaced sensors, arranged to detect a line of packets sufficient to complete a batch, and a second detector arranged to detect when said batch is correctly positioned in a compartment. The detector means may also include means positioned adjacent the downstream end of said accumulator. The detector means may comprise a pressure operated member operable by a packet.

The apparatus may still further include means for raising packets on the delivery path and means for lowering packets on the receiving path, said transfer position being at an elevated position relative to an upstream portion of the delivery path and a downstream portion of the receiving path. An elevated transfer position and correspondingly elevated portions of the delivery path and receiving path allow good access around the accumulator and between opposite sides of the path extending between delivery and receiving devices. The storage positions of the accumulator may be arranged below the transfer position or may also be at an elevated level.

According to another aspect of the invention there is provided packet handling apparatus including a reversible accumulator for packets, first conveyor means for feeding packets towards and into said accumulator, second conveyor means for feeding packets away from said accumulator, said accumulator being arranged to receive a batch of packets from said first conveyor means for temporary storage in said accumulator, gate means positioned downstream of said accumulator, including a gate movable to an operative position to stop packets and assemble a batch in said accumulator, means for moving said accumulator to move said batch of packets into a stored position, detector means positioned adjacent said gate for detecting a packet stopped by said gate, and means for activating the accumulator moving means following a signal from the detector means that packets in said batch are correctly assembled for movement into a stored position. The accumulator may have compartments for receiving and storing batches of packets. Preferably the first and second conveyor means are in alignment and said accumulator moving means comprises reversible drive means for moving successive compartments into a transfer position in alignment with the first and second conveyor means. The first conveyor means may include means for raising packets and the second conveyor means may include means for lowering packets. The detector means may be downstream of the accumulator and may be associated with the gate. The detector means may respond to the position of a packet on said second conveyor means; said packet may be the stopped packet next to the gate. The detector means may be resettable and responsive to pressure of packets against the gate means. The detector means may comprise spaced detectors arranged upstream of said gate and separated by a distance at least substantially equal to the length of a compartment or of a batch of packets.

According to a still further aspect of the invention there is provided packet handling apparatus comprising a packet delivery device; a packet receiving device; an accumulator having compartments for receiving and storing batches of packets; delivery conveyor means for feeding packets along a path towards the accumulator, receiving conveyor means for feeding packets along said path away from the accumulator, and reversible drive means for moving successive compartments into a transfer position in alignment with the delivery conveyor means and with the receiving conveyor means and forming part of said path, the delivery conveyor means including means for driving packets through a compartment of the transfer position, means for assembling a batch of abutting packets on said path at least partly upstream of said transfer position, detector means for detecting when a complete batch of packets is in said compartment, and means for indexing said compartment drive means to move said compartment away from said transfer position following a signal from said detector means. Preferably the packet driving means is stopped or otherwise rendered inoperative following a signal from the detector means. At the same time gate means may be operated to prevent further delivery of packets towards the accumulator during indexing. The detector means may be responsive to pressure from said driving means, e.g. as transmitted by an abutted line of packets. Alternatively the detector means may comprise spaced detectors arranged to detect a line of packets sufficient to complete a batch. The detector means may comprise first detector means for detecting a line of packets sufficient to form a batch and a second detector means for detecting when said batch is correctly positioned in a compartment. Thus the first detector means, which may comprise spaced sensors, may detect a batch at a position upstream of the transfer position. The first detector means may activate the packet driving means to move the assembled batch into the transfer position. Means may be provided for stopping the batch of packets downstream of the accumulator, e.g. on the receiving conveyor means. The detector means may be associated with the stopping means and may for example comprise a pressure operated switch carried by a gate.

The packet driving means may include at least one conveyor and means for pressing packets onto the conveyor to more positively engage packets, and means for releasing the pressing means at times other than when it is required to drive through a compartment at the transfer position.

According to a still further aspect of the invention there is provided packet handling apparatus comprising a packet delivery device, a packet receiving device, an accumulator having compartments for receiving and storing batches of packets, delivery conveyor means for feeding packets towards the accumulator, receiving conveyor means for feeding packets away from the accumulator, reversible drive means for moving successive compartments into a transfer position in alignment with the delivery conveyor means, the delivery conveyor means including at least one conveyor and means for pressing packets onto said conveyor to more positively engage packets for driving packets into and through a compartment at the transfer position, and control means for releasing said pressing means at times other than when it is required to drive packets through a compartment at the transfer position. The delivery conveyor means may comprise opposed conveyors which include a plurality of parallel spaced bands arranged on each side of a packet and a low-friction pressure member in engagement with the bands on at least one side. The delivery conveyor means may also include a further conveyor on which packets are delivered to said opposed conveyors: the speed of the opposed conveyors may be higher than that of said further conveyor to increase (or create) a spacing between successive packets. The delivery conveyor means may include means for raising packets and the receiving conveyor means may include means for lowering packets.

Figure 2:
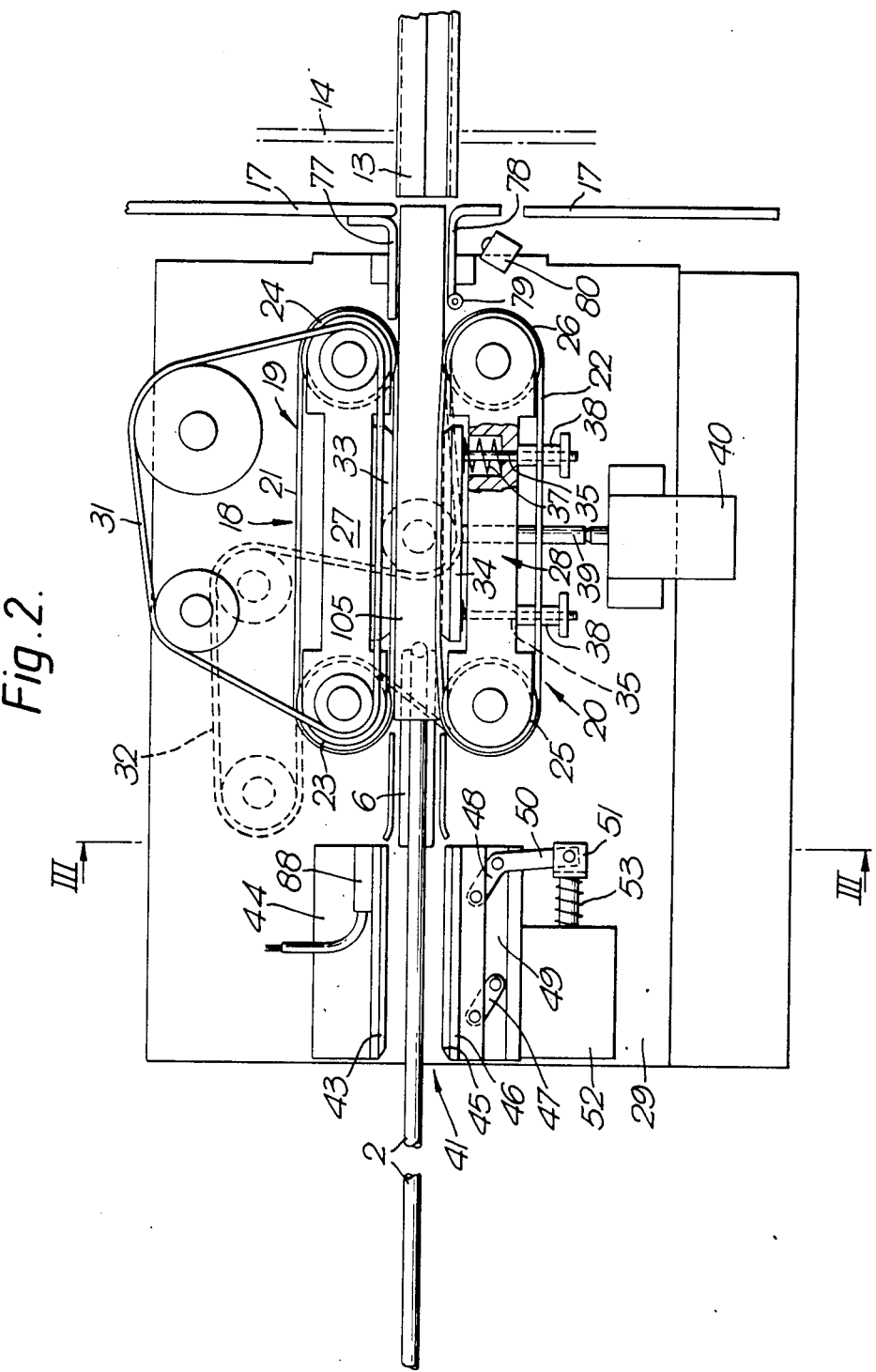
Figure 3:
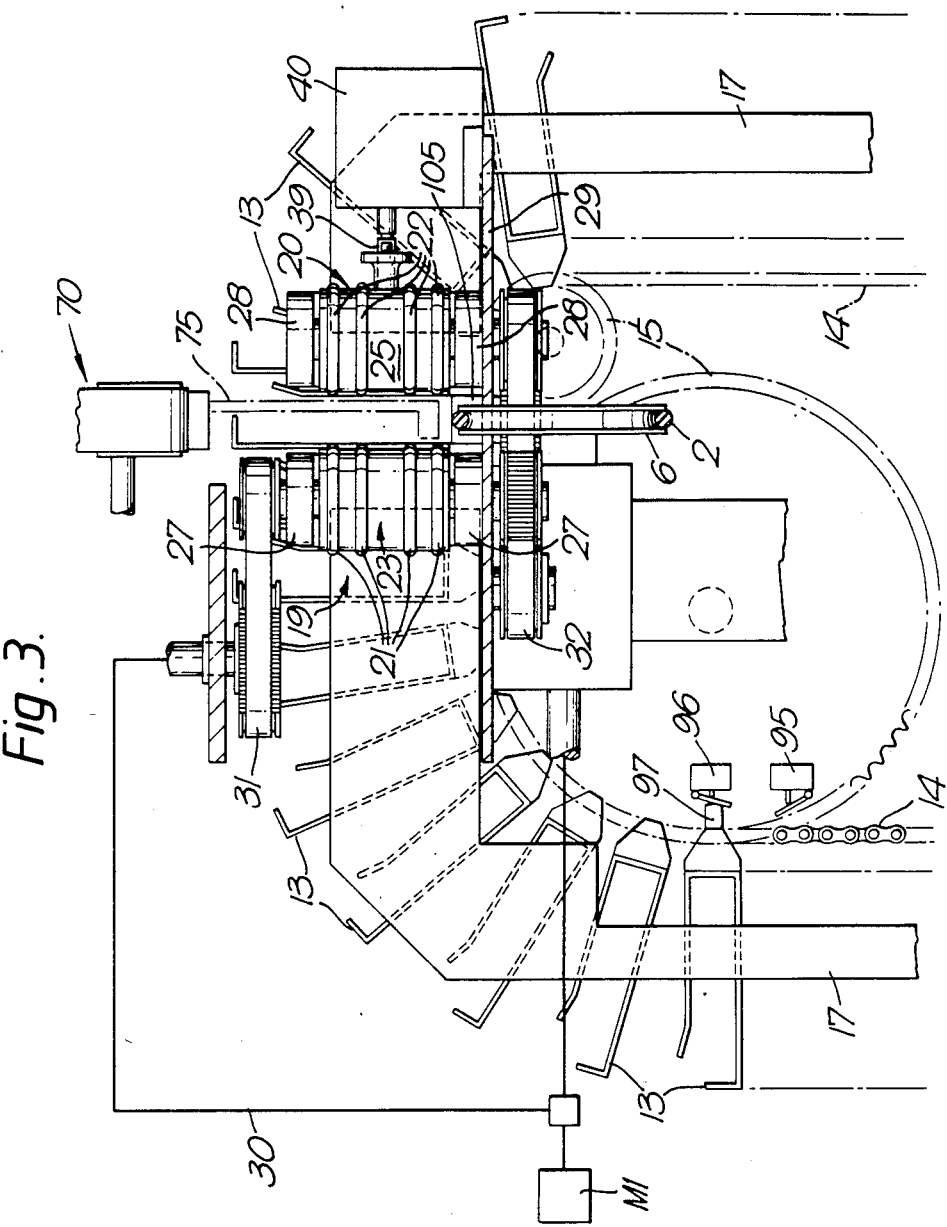
Figure 4:
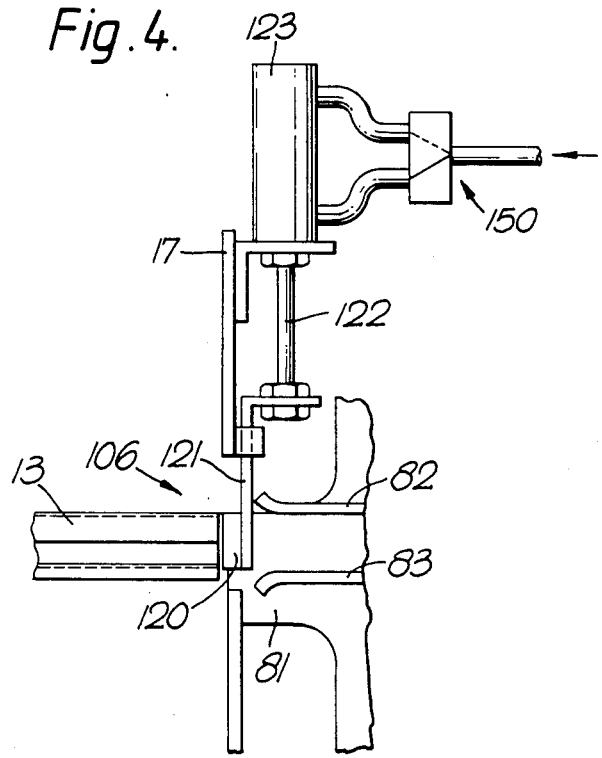
Figure 5:
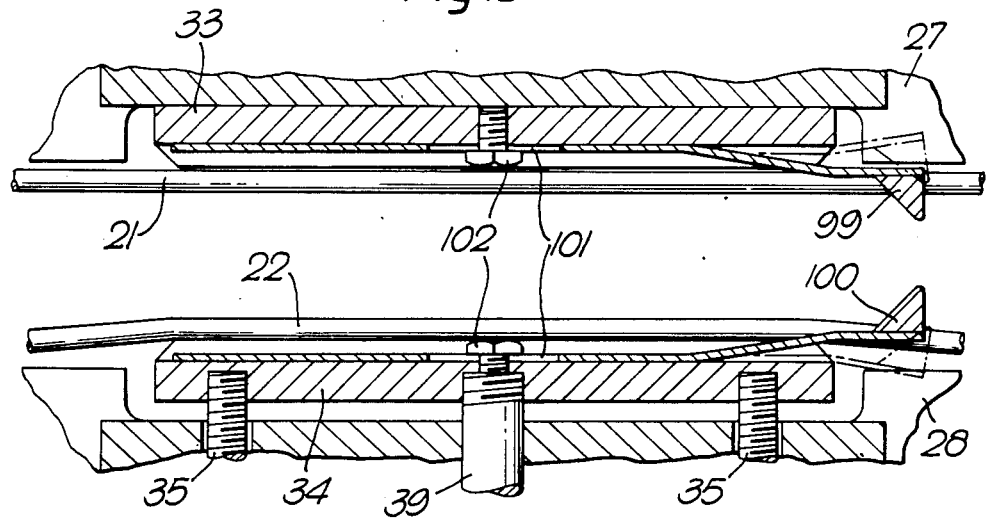
Figure 8:
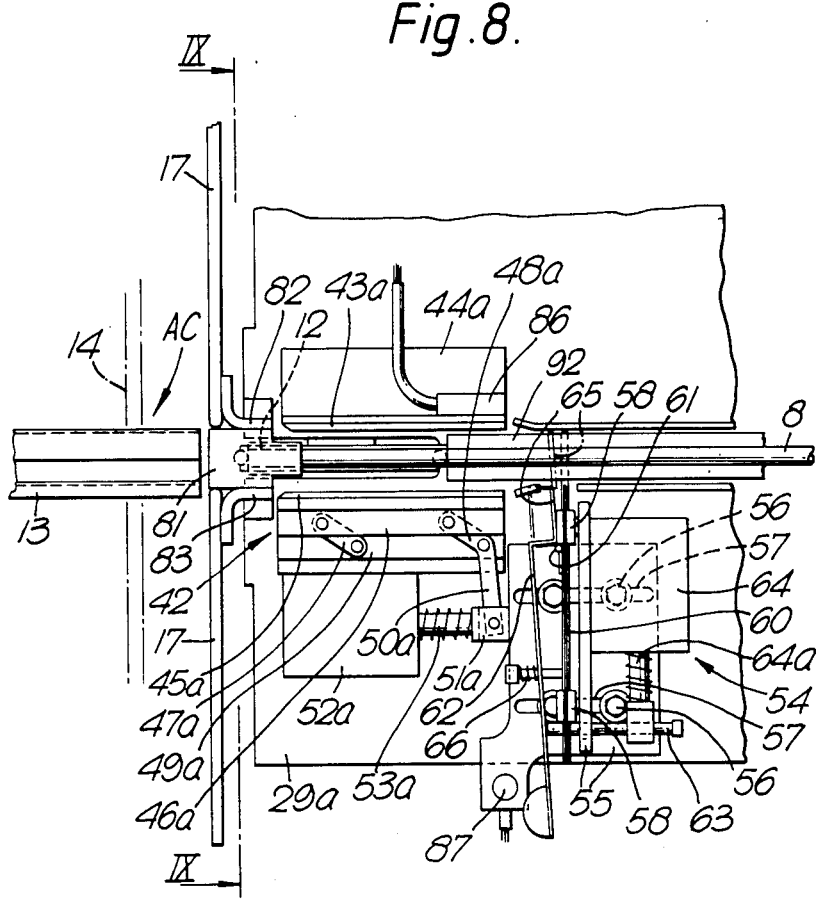
Figure 9:
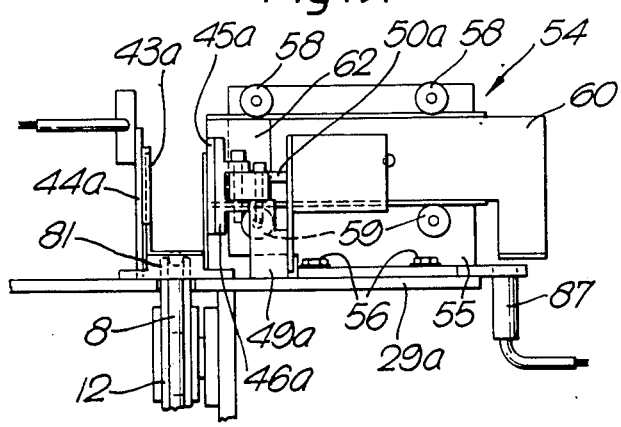

The invention will now be described, by way of example only, with reference to the accompanying diagrammatic drawings in which:

FIG. 1 is a front view of packet handling apparatus including a packet accumulator, FIG. 2 is a plan view of part of the apparatus of FIG. 1 near the upstream end of the accumulator, FIG. 3 is a section taken on the line III—III of FIG. 2, FIG. 4 is a plan view of part of the apparatus of FIG. 1 near the downstream end of the accumulator;

FIG. 5 is a sectional view of part of the apparatus of FIG. 1, drawn to a larger scale, FIG. 6 is a block diagram of circuits for controlling the operation of the apparatus, FIG. 7 is a front view of a modified form of packet handling apparatus, FIG. 8 is a plan view of partof the apparatus of FIG. 7 near the downstream end of the accumulator, and FIG. 9 is a section taken on the line IX—IX of FIG. 8, FIG. 1 shows a packet handling apparatus in which packets of cigarettes produced in a packing machine PM are conveyed by longitudinally aligned conveyors C1, C2 towards a wrapping machine WM. Positioned between opposed ends of the conveyors C1, C2 is a packet accumulator AC which is operable to accept packets from conveyor C1 and store them temporarily, feed stored packets to conveyor C2, or allow packets to be fed from conveyor C1 directly to conveyor C2, according to conditions in the apparatus as monitored by packet sensors positioned along the conveyors C1, C2.

The conveyor C1 consists of upper and lower endless bands 1, 2 respectively, which are of circular cross section and extend between respective pulleys 3, 4 and 5, 6, the latter being driven from a motor M1 (FIGS. 1 and 3). Packets issuing from the machine PM are fed as a spaced stream between the bands 1, 2. The packets are conveyed in an upright position, with their longest axes vertical and their shortest axes transverse to the direction of feed. The lower band 2 extends some distance further downstream than the upper band 1. The conveyor C2 consists of upper and lower endless bands 7, 8, respectively, which are similar to the bands 1, 2, and extend between respective pulleys 9, 10 and 11, 12, the latter being driven by a motor M2. The upper band 7 starts some distance further downstream than the lower band 8. Suitable side guides (not shown) are provided for the packets on both conveyors C1 and C2.

The accumulator AC comprises an endless series of compartments 13 carried on chains 14 and provides a packet store extending generally below the level of the conveyors C1, C2. At the upper end of the accumulator AC the chains 14 pass around sprockets 15 which are driven intermittently by a motor M3 (FIG. 1). Each compartment 13 is adapted to hold a nominal batch of twenty abutted packets, but the number will vary depending on the width of the packets. When the accumulator AC is stationary, one of the compartments 13 is aligned with the bands 2, 8 so that packets may be fed from conveyor C1, through the aligned compartment 13 and on to the conveyor C2. Alternatively a batch of packets received in a compartment 13 may be stored by indexing the chains 14 by an amount corresponding to the spacing of the compartments. A stationary plate 17 mounted a short distance from each end of the compartments 13 in their stored positions prevents packets falling out of the open ends of the compartments. The conveyors C1, C2 are positioned in line with the top of the accumulator AC so as to provide access between opposite sides of the system underneath the conveyors C1, C2. The packets are raised from the level at which they leave the machine PM to the level of the conveyors C1, C2, upstream of the accumulator AC, and lowered to the lever at which they enter the machine WM, downstream of the accumulator AC. The raising and lowering of the packets may be as described and illustrated in UK patent application No. 2097744A.

Referring particularly to FIGS. 2 and 3, at the downstream end of the band 2 is a packet drive unit 18 consisting of two short conveyors 19, 20 each comprising respectively four vertically spaced endless bands 21, 22. The latter extend between respective pairs of pulleys 23, 24 and 25, 26. These pairs of pulleys are journalled in respective blocks 27, 28 with their rotational axis vertical. The blocks 27, 28 are fixed to a base plate 29 on opposite sides of the band 2 so that the opposed runs of the bands 21, 22 may co-operate to grip the packets on band 2 and feed them into the waiting aligned compartment 13. The bands 21, 22 are driven by the motor M1 through a drive 30 and belts 31, 32, at the same linear speed, or at a speed slightly greater than, the band 2. To prevent packets from falling downwards from between the bands 21, 22 a support plate 105 is provided which extends between the band 2 and the accumulator AC.

The opposed runs of the bands 21, 22 pass over respective pads 33, 34, of which the faces in contact with the bands 21, 22 are covered with a plastics material having a low coefficient of friction. The pad 33 is fixed to the block 27, but the pad 34 is arranged to be spring-loaded so that the required pressure can be applied to enable packets on the band 2 to be gripped between the opposed runs of bands 21, 22 and fed forwards. To this end the pad 34 is carried on two rods 35, which extend through the block 28, springs 37 (only one of which is shown in FIG. 2) urging pad 34, and therefore also the bands 22, towards the opposed runs of bands 21 to thus grip any packet present. To cater for different thicknesses of packets being fed through the apparatus, an adjustable stop 38 is provided on each of the rods 35. A bar 39, forming an extension of the core of a solenoid 40, and passing through the block 28, is attached to the pad 34. At certain times, as will be explained later, the solenoid 40 is energised to move the pad 34 against the spring 37 and thus relieve the grip applied to the packets. Alternatively, the pad 34 could be moved by pneumatic pressure, in which case the bar 39 forms the piston rod of a pneumatic actuator. Mounted respectively on pads 33, 34 are spring catches 99, 100 (FIG. 5) which are arranged to project into the path of the packets as they pass between bands 21, 22. Each catch 99, 100 has a slot 101 so that it may be fixed, by a bolt 102, in a required position dependent upon the size of the packets being handled. The catches are shaped so as to allow packets to be fed towards the accumulator AC, but prevent any movement in the opposite direction.

Positioned between the downstream end of the upper band 1 and the packet drive unit 18 is an inlet packet clamp 41 (FIGS. 1, 2). The unit 41 consists of a plate 43 fixed to a bracket 44 which is adjustably fixed to the base plate 29 on one side of the band 2. Opposite the plate 43, on the other side of band 2, is a further plate 45, fixed to a bracket 46 which is pivotally carried on one end of each of two parallel levers 47, 48. The other ends of the levers 47, 48 are pivoted to support 49 bolted to the base plate 29. The lever 48 has an extension 50 which is pivoted to a block 51 carried on the outer end of the core of a solenoid 52 which, energised, as will be explained later, causes the plate 45 to be moved towards the plate 43 and thus grip a packet positioned therebetween to stop it from being fed by the band 2. When the solenoid 52 is de-energised. A spring 53 returns the plate 45 to its original position. The bracket 44 is adjustable towards and away from the band 2 to allow packets of different thicknesses to be handled. Alternatively the solenoid 52 could be replaced with a pneumatic actuator for moving the plate 45 at the required times.

Referring to FIG. 4, positioned close to the downstream end of an aligned compartment 13 is a stop gate 106. This consists of a plate 120 carried on a slide 121 fixed to the outer end of the piston rod 122 of a double acting pneumatic cylinder 123. At certain times, as will be described later, air is fed to one end of the cylinder 123 and plate 120 is moved to an operative position in which it is inserted into the path of the packets being fed towards the machine WM. When air is fed to the other end of cylinder 123 the plate 120 is moved to an inoperative position, in which it is withdrawn from the path of the packets. Air is admitted to one end or the other end of cylinder 123 by operation of a double acting solenoid valve 150.

As shown in FIGS. 1 and 3, positioned above the accumulator AC is an unloading conveyor 70 comprising an endless band 71 which extends between pulleys 72, 73 and is driven by a motor M4. Fixed to the band 71 are two equi-spaced pushers 75 and 75a. Under normal conditions the band 71 is stationary with the pushers in the positions shown in FIG. 1. At certain times, as will be described later, the motor M4 is energised to drive the band 71 in an anti-clockwise direction so that one of pushers 75, 75a passes through the compartment 13 aligned with the lower bands 2, 8 to push the packets stored therein out of the compartment and on to the band 8.

Side walls 77, 78 are provided at the downstream of plate 105 to prevent the packets from falling over sideways. The wall 77 is formed as an extension of the plate 17, and the wall 78 is pivoted at 79 so that, under certain conditions, it swings about pivot 79 and operates a switch 80.

A bridge member 81 (FIG. 4) is provided to support the packets as they pass from a compartment 13 to the upstream end of band 8, side walls 82, 83 preventing the packets from falling sideways. A top guide 124 (FIG. 1) is provided to stop the leading ends of packets from lifting as they are fed off the bridge member 81.

Two micro-switches 95, 96 (FIG. 3) are fixed in adjacent positions in the path of a projection 97 carried by one of the compartments 13. The switches are mounted so that they are spaced apart, along the path of movement of the compartments, by a distance equal to the distance between adjacent compartments.

Positioned above the aligned compartment 13 of the accumulator AC and approximatedly two thirds of the way along from the upstream end thereof is a photoelectric detector 107 (FIG. 1). A further photoelectric detector 108 is also positioned above the same compartment 13 but at the downstream end thereof.

The operation of the apparatus will now be described with added reference to FIG. 6. When the apparatus is first installed and before any packets are fed into the accumulator AC, the compartments 13 are moved to a datum position in which the compartment carrying the projection 97 is in the position at which the projection 97 operates the switch 96. It is assumed that the packing machine PM and wrapping machine WM are both running at the same speed, the accumulator AC is stationary with one compartment 13 aligned with bands 2 and 8, and the motors M1 and M2 energised. The packets are fed, spaced apart, by band 2, the main purpose of band 1 being to prevent packets from tipping over forwards or backwards. The solenoid 52 is not energised so the packets will pass freely between the plates 43, 45. On reaching the packet drive unit 18 each successive packet is gripped between the opposed runs of bands 21, 22 and fed forward until that grip is released as the bands turn round respective rollers 24, 26, the packet coming momentarily to rest at the downstream end of plate 105. As successive packets are fed by bands 21, 22 the previous packet is moved one packet width and, in this way, a line of abutted packets is formed which extends from the end of plate 105 through the aligned compartment 13 and on to the bridge 81. The packets are fed past the stop gate 106 which is in its inoperative position. As each packet in turn is pushed off the bridge 81 it contacts the band 8 and is fed forward by it towards the wrapping machine WM, the top guide 124 preventing the front of the packet from lifting as this takes place. The speed of band 8 is substantially the same as that of band 2 so that the packets are spaced apart on the band 8.

If the machine WM stops and the machine PM continues running, the packets are loaded into the accumulator AC as described below.

When the wrapping machine WM stops a signal is sent to the control unit CU (FIG. 6), which causes the solenoid 52 of clamp 41 to be energised and thus move the plate 45 so that the next packet is stopped by being gripped between the plates 43 and 45.

Packets downstream of the clamp 41 continue to be fed by unit 18 towards the machine WM, and when detector 88, positioned upstream of the drive unit 18, detects a gap, the unit CU causes the solenoid 40 to be energised, after a short delay, which retracts the pad 34 against springs 37 and pressure exerted on the packets by the bands 21, 22 is released so as to stop the feeding of packets. Alternatively the detector 88 may be positioned as shown at 88a in FIG. 1, in which case the delay is not necessary.

The unit CU then causes motor M4 to be energised which drives the band 71 of the unloading conveyor 70 for half a revolution of the band in an anti-clockwise direction starting from the position shown in FIG. 1. During this period the pusher 75 passes between the opposed runs of bands 21, 22, and through the aligned compartment 13 and pushes all the packets one by one on to the band 8 and thence towards the machine WM. When the pusher 75a reaches a proximity detector 89 the latter is activated and, via the unit CU, the motor M4 is stopped with the pusher 75a in the position previously occupied by the pusher 75.

When the conveyor 70 comes to rest the solenoid 150 is operated to admit air to cylinder 123 to move the gate 106 to its operative position in the path of the packets. At the same time the clamp 41 is released and packets again start to be fed towards the accumulator AC. The bands 1, 2 start feeding packets through the unit 18 and into the now empty aligned compartment 13. By this time also the bands 7 and 8 will be stopped.

When the leading packet is detected by detector 107, and providing that packets are passing detector 88, the unit 18 is operated so that once again packets are fed by it. At the same time the clamp 41 is operated to temporarily stop the flow of packets from the packing machine PM. The positions of the detectors 88 and 107 are such that the distance between them is at least equal to the length of a compartment 13. When the leading packet contacts, and is stopped by, the gate 106, the presence of that packet is detected by detector 108 and this causes the unit 18 to again stop feeding packets. When this happens the packets, as explained above, tend to expand, and any undedesired movement is prevented by the catches 99, 100. At this time there is an abutted line of packets extending from the gate 106 to the catches 99, 100.

The unit CU then causes the motor M3 to drive the chains 14 and therefore the compartments 13 (the aligned compartment 13 now being full of packets), in a clockwise direction in FIG. 3, until the next empty compartment 13 is aligned with bands 2, 8, when the motor M3 is stopped. The length of the compartments 13 is so chosen, depending on the width of packets being handled, that the two end packets in a compartment extend beyond the respective ends of the compartment by a small amount. To ensure the correct positioning of the packets in a compartment 13, the position of the gate 106 is set so that, when the cylinder 123 is operated, the position of the first packet in the aligned compartment 13 is correct relative to the downstream end of the compartment. The position of the upstream end packet will be correct only if all the packets are correctly abutted. If this is the case the two end packets will pass between the plates 17 as the accumulator AC is indexed. If, however, one or more of the packets downstream of the plate 105, is damaged, so that they do not abut correctly, the packets will not be correctly positioned in the aligned compartment 13. When this happens, and the accumulator AC is indexed, the packet at the upstream end of the aligned compartment will hit the wall 78 and swing it about pivot 79 to operate switch 80 which causes the whole apparatus to be stopped so that the damaged packet may be removed.

When the motor M3 stops, the unit CU causes both the solenoids 52 and 40 to be de-energised, thus releasing the pressure applied by inlet packet clamp 41 and applying pressure by the packet drive unit 18. Packets are then fed, by band 2 and drive unit 18, until the detector 108 detects again the leading packet stopped by gate 106, when the sequence of operations described above is repeated. All the time that the machine WM is not operating, successive compartments 13 are loaded with packets and the accumulator AC is indexed in a clockwise direction until the compartment carrying the projection 97 reaches the position at which the projection 97 operates the switch 95. This causes a signal to be sent to the unit CU indicating that all the compartments 13 usable for storage are now full. If this occurs and the machine WM is still not operating, the machine PM is also stopped.

When the machine WM restarts during a period when the accumulator AC is being loaded the motor M2 is started, to drive band 8, and after completion of any loading sequence in process, air is fed to the cylinder 123, by operation of solenoid 150, to withdraw the plate 120 from the path of the packets on band 8. Packets are then again fed directly from machine PM to the machine WM as described earlier.

If the machine PM stops and the machine WM continues running, the latter is kept supplied with packets by unloading the accumulator as described below.

When the machine PM stops a signal is sent to unit CU, and the detector 88 detects the next gap in the succession of packets on band 2, and causes solenoid 52 to be energised, thus moving plate 45 to stop the next packet by gripping it between itself and plate 43. The band 2 continues to run and the drive unit 18 continues to feed packets into the aligned compartment 13 until the packet downstream of the packet gripped between plates 43 and 45, comes to rest on the downstream part of plate 105. At this time a stationary line of abutted packets extends between the plate 105 and bridge member 81. After a predetermined time the motor M1 is stopped and thus also the band 2.

The unit CU then causes motor M4 to drive the unloading conveyor 70 for half a revolution, as described above, so as to push all the packets on the end part of plate 105 and in the aligned compartment 13 on to the band 8.

The motor M3 is then energised through unit CU to drive the chains 14 in an anti-clockwise direction in FIG. 3, until the next filled compartment is aligned with the bands 2, 8, when the motor M3 is stopped. The motor M4 is again driven so that the packets in the newly aligned compartment 13 are pushed on to band 8 by pusher 75a, the band 71 coming to rest again when the pusher 75 activates the detector 89, and the sequence of operations described above is repeated. All the time that the machine PM is not operating, successive compartments 13 are emptied of packets, as described above, and the accumulator AC indexed in an anti-clockwise direction until the compartment carrying the projection 97 reaches the position at which the projection 97 operates switch 96. This causes a signal to be sent to the unit CU indicating that all the compartments 13 (other than the aligned compartment) are now empty. If this occurs and the machine PM is still not operating, and a detector 90 (FIG. 1) detects that only a predetermined minimum number of packets is present on band 8, the machine WM is also stopped. If the machine PM begins operating again before the accumulator AC is empty of packets, the motor M1 is started to drive band 2, and when the motor M4 is next stopped (i.e. when any unloading sequence in process has been completed), the unit CU causes the solenoid 52 to be de-energised and to release the inlet packet clamp 41 so that packets are again fed directly to the machine WM.

With both machines PM and WM operating normally the apparatus is controlled so that the accumulator AC is kept empty. If packets are present in the accumulator AC the speed of machine WM is increased so that it is higher than that of machine PM, and when detector 90 detects only the predetermined minimum number of packets on band 8 the sequence of operations, described above, for unloading one batch of packets from an aligned compartment 13 is initiated. When the inlet packet clamp 41 is released at the end of this sequence, the packets are fed directly to the machine WM until the detector 90 is again activated to indicate that the machine WM can accept another batch of packets from the accumulator AC.

A modified form of apparatus will now be described with added reference to FIGS. 7, 8 and 9. The apparatus is mainly the same as already described and like parts are given similar reference numbers. Generally only the main differences in the modified apparatus will be described.

The bridge member 81 is extended to the upstream end of a track 92 for the band 8 and adapted to lift the packets clear of the band 8.

Positioned at the upstream end of lower band 8 is an outlet packet clamp 42 which is the same in design and operation as the inlet packet clamp 41 described with reference to FIG. 2. Parts of unit 42 corresponding to those of unit 41 have similar reference numbers but with the addition of the suffix a. Positioned immediately downstream of the packet clamp 42 is a detector gate 54. This consists of a bracket 55 which can be fixed, by bolts 56, in any position along two slots 57 in the bracket 55. Rotatably fixed on the bracket 55 are two pairs of grooved rollers 58, 59, between which is mounted a slide 60. Carried on the latter, by means of a hinge 61, is a detector plate 62. Fixed to slide 60, near one end thereof, is a rod 63 which extends through a slot in the bracket 55 and is attached to the outer end of the core of a solenoid 64. When the latter is energised the slide 60 is moved between the rollers 58, 59, and the detector plate 62 is moved to an operative position in which one end 65 thereof is inserted into the path of the packets being fed towards the machine WM. When the solenoid 64 is de-energised the detector plate 62 is moved, by a spring 64a, to an inoperative position, in which the end 65 is withdrawn from the path of the packets. The detector plate 62 is urged in an anti-clockwise direction about the hinge 61, by a spring 66, against a stop formed by one end of the rod 63.

With the packets being fed to the machine WM, as described above, when the latter stops a signal is sent to a control unit CU. When a photo-electric detector 86 (FIG. 8), positioned at the downstream end of the outlet packet clamp 42, detects the next gap in the succession of packets the unit CU causes the solenoid 52a to be energised and thus move the plate 45a so that the next packet is stopped by being gripped between the plates 43a and 45a. In a further modification the detector 86 may be removed and the packet clamp 42 operated immediately the machine WM stops.

At this time the band 8 is still running so the packets downstream of the unit 42 continue to be fed, and the gap detected by detector 86 increases. After a short delay, sufficient to ensure that the gap extends past the gate 54, the band 8 is stopped and the unit CU causes the solenoid 64 to be energised, and the slide 60 and detector plate 62 of the gate 54 are inserted into the path of the packets on band 8, as shown in chain-dot lines in FIG. 8. The solenoid 52a is then de-energised and the plate 45a is moved, by action of the return spring 53a, to release the gripped packet (or packets). The packets continue to be fed by bands 21, 22 of drive unit 18 until the leading packet contacts the end 65 of detector plate 62. The latter swings clockwise about the hinge 61 and the other end of plate 62 moves towards a proximity detector 87. When detector 87 is activated the unit CU causes the solenoid 40 to be energised which retracts the pad 34 against spring 37 and pressure exerted on the packets by the bands 21, 22 is released. hen this happens the line of abutted packets extends from the detector plate 62 at least back to the plate 105. At this time band 3, which extends up to the plate 105, is still being driven and slips beneath the stationary packets supported thereon. At the same time the unit CU also causes the solenoid 52 to be energised, thus moving the plate 45 so as to grip the packet (or packets) positioned between itself and plate 43.

After the previous batch of packets has been moved into storage in the accumulator AC as just described, the packets remaining between the detector plate 62 and the downstream end of the compartment 13 are pushed a short distance upstream by the detector plate 62 and spring 66, and thus the other end of detector plate 62 is moved away from detector 87, thereby resetting the detector. Packets are then fed, by band 2 and drive unit 18, until the end 65 of detector plate 62 is again contacted by the leading packet, when the sequence of operations described above is repeated.

The rest of the operation of the aparatus of FIGS. 7, 8 and 9 is the same as that described above with reference to FIGS. 1 to 6.

The main difference in operation of the modified apparatus is that during loading of the accumulator AC the unloading conveyor 70 is not operated. This is simpler, but in some conditions of operation the use of the unloading conveyor to remove packets from a compartment at the transfer position is desirable. This is particularly so where there is any risk of packets falling over or otherwise lying in other than an upright position in the compartment, in which case the length of a batch of packets will be greater than the length of a compartment, and the apparatus may jam when the accumulator is indexed.

We claim:

1. Packet handling apparatus comprising an accumulator having a plurality of compartments for receiving and storing batches of packets, means defining a delivery path on which packets are moved towards said accumulator, reversible drive means for moving successive compartments into a transfer position in alignment with said delivery path, means defining a receiving path on which packets are moved away from the accumulator, first and second conveying means each being arranged for conveying packets along at least part of the delivery path and through a compartment at the transfer position, said second conveying means including at least one pusher movable through a compartment at the transfer position, and control means for operating a selected one of said first and said second conveying means according to the operating condition of the accumulator, so that either said first or said second conveying means conveys packets along said part of the delivery path and through a compartment at said transfer position said control means including first detector means comprising spaced sensors for detecting a complete batch of packets upstream of said transfer position and second detector means downstream of said first detector means for detecting when said complete batch has moved to said transfer position.

2. Apparatus as claimed in claim 1 in which said first conveying means is operable to move packets into a compartment to form a batch for storage in the accumulator.

3. Apparatus as claimed in claim 2 in which the second conveying means is operable to remove a batch of packets from a compartment during unloading of the accumulator.

4. Packet handling apparatus comprising an accumulator having a plurality of compartments for receiving and storing batches of packets, means defining a delivery path on which packets are moved towards said accumulator, reversible drive means for moving successive compartments into a transfer position in alignment with said delivery path, means defining a receiving path on which packets are moved away from the accumulator, first and second conveying means each being arranged for conveying packets along at least part of the delivery path and through a compartment at the transfer position, and control means for operating a selected one of said first and said second conveying means according to the operating condition of the accumulator, so that either said first or said second conveying means conveys packets along said part of the delivery path and through a compartment at said transfer position, said first conveying means being operable to move packets into a compartment to form a batch from storage in the accumulator and said second conveying means being operable to remove a batch of packets from a compartment during unloading of the accumulator wherein the control means includes means for operating said second conveying means to completely remove all of the packets from a compartment prior to operation of the first conveying means to move packets into a compartment at the beginning of a transfer sequence for loading packets into the accumulator.

5. Apparatus as claimed in claim 4 wherein the second conveying means includes at least one pusher movable through a comparTment at the transfer position.

6. Apparatus as claimed in claim 2 further including gate means for stopping packets in the transfer position prior to operation of the drive means to move a loaded compartment from the transfer position into a storage position.

7. Packet handling apparatus comprising an accumulator having a plurality of compartments for receiving and storing batches of packets, means defining a delivery path on which packets are moved towards said accumulator, reversible drive means for moving successive compartments into a transfer position in alignment with said delivery path, means defining a receiving path on which packets are moved away from the accumulator, first and second conveying means each being arranged for conveying packets along at least part of the delivery path and through a compartment at the transfer position, control means for operating a selected one of said first and said second conveying means according to the operating condition of the accumulator, so that either said first or said second conveying means conveys packets along said part of the delivery path and through a compartment at said transfer position, and gate means for stopping packets in the transfer position prior to operation of the drive means to move a loaded compartment from the transfer position into a storage position, said first conveying means being operable to move packets into a compartment to form a batch for storage in the accumulator wherein the control means includes means for operating said second conveying means to remove packets from the compartment prior to operation of the gate means to assemble a batch of packets for loading into the accumulator.

8. Apparatus as claimed in claim 1 in which said first conveying means includes means for driving packets into and through a compartment at the transfer position, wherein said packet driving means includes at least one conveyor and means for pressing packets onto said conveyor to more positively engage the packets, and means for releasing said pressing means at times other than when it is required to drive packets through a compartment at the transfer position.

9. Apparatus as claimed in claim 8 in which the packet driving means comprises opposed conveyors which include a plurality of parallel spaced bands arranged on each side of a packet and said pressing means includes a low friction pressure member in engagement with the bands on at least one side.

10. Apparatus as claimed in claim 9 further including further gate means positioned upstream of the packet driving means and means for operating said further gate means to prevent further feeding of packets towards the accumulator during operation of the reversible drive means, wherein the packet driving means is positioned between the further gate means and the accumulator.

11. Apparatus as claimed in claim 4, further including detector means arranged to detect when a complete batch of packets is contained in a compartment at the transfer position.

12. Apparatus as claimed in claim 11 including means for stopping or rendering inoperative the first conveying means following a signal from the detector means.

13. Apparatus as claimed in claim 12 in which said detector means comprises a first detector consisting of spaced sensors, arranged to detect a line of packets sufficient to complete a batch, and a second detector arranged to detect when said batch is correctly positioned in a compartment.

14. Apparatus as claimed in claim 12 in which said detector means includes means positioned adjacent the downstream end of said accumulator.

15. Packet handling apparatus comprising an accumulator having a plurality of compartments for receiving and storing batches of packets, means defining a delivery path on which packets are moved towards said accumulator, reversible drive means for moving successive compartments into a transfer position in alignment with said delivery path, means defining a receiving path on which packets are moved away from the accumulator, first and second conveying means each being arranged for conveying packets along at least part of the delivery path and through a compartment at the transfer position, control means for operating a selected one of said first and said second conveying means according to the operating condition of the accumulator, so that either said first or said second conveying means conveys packets along said part of the delivery path and through a compartment at said transfer position, and detector means arranged to detect when a complete batch of packets is contained in a compartment at the transfer position, said detector means comprising a pressure operated member operable by a packet, including means for selectively moving said member into the path of a packet and for retracting said member from said path.

16. Packet handling apparatus including a reversible accumulator for packets, first conveyor means for feeding packets towards and into said accumulator, second conveyor means for feeding packets away from said accumulator, said accumulator being arranged to receive a batch of packets from said first conveyor means for temporary storage in said accumulator, means for assembling an abutting line of packets to form a batch at least partly upstream of said accumulator, means for sensing the presence of a complete batch at least partly upstream of said accumulator, gate means positioned downstream of said accumulator, including a gate movable to an operative position to stop packets with a batch in said accumulator, means for moving said accumulator to move said batch of packets into a stored position, detector means positioned downstream of said accumulator and adjacent said gate for detecting a packet stopped by said gate, and control means for activating the accumulator moving means following a signal from the detector means in response to presence of a packet adjacent said gate when said sensing means has previously indicated that packets in said batch are correctly assembled for subsequent movement into a stored position.

17. Apparatus as claimed in claim 16 in which said accumulator has compartments for receiving and storing batches of packets.

18. Apparatus as claimed in claim 17 in which the first and second conveyor means are in alignment and said accumulator moving means comprises reversible drive means for moving successive compartments into a transfer position in alignment with the first and second conveyor means.

19. Packet handling apparatus comprising a packet delivery device; a packet receiving device; an accumulator having compartments for receiving and storing batches of packets; delivery conveyor means for feeding packets along a path towards the accumulator, receiving conveyor means for feeding packets along said path away from the accumulator, and reversible drive means for moving successive compartments into a transfer position in alignment with the delivery conveyor means and with the receiving conveyor means and forming part of said path, the delivery conveyor means including means for driving packets through a compartment at the transfer position, means for assembling a batch of abutting packets on said path at least partly upstream of said transfer position, said packet driving means being arranged to move said batch to said transfer position, detector means for detecting when said batch of packets is completely in said compartment, said detector means including first detector means for detecting a line of packets sufficient to form a batch and second detector means for detecting when said batch is correctly positioned in a compartment, and means for indexing said compartment drive means to move said compartment away from said transfer position following a signal from said detector means, so that said batch is stored in said accumulator.

20. Apparatus as claimed in claim 19 including means for stopping the packet driving means or rendering it inoperative following a signal from said second detector means.

21. Apparatus as claimed in claim 20 in which the first detector means comprises spaced detectors arranged to detect a line of packets sufficient to complete a batch.

22. Apparatus as claimed in claim 19 in which the first detector means includes means for detecting the presence, at a position upstream of the transfer position, of sufficient packets to form a batch.

23. Apparatus as claimed in claim 22 in which the first detector means includes means for activating the packet driving means to move the assembled batch into the transfer position.

24. Apparatus as claimed in claim 19 wherein said packet driving means includes at least one conveyor and means for pressing packets onto said conveyor to more positively engage the packets, and means for releasing said pressing means at times other than when it is required to drive packets through a compartment at the transfer position.

25. Packet handling apparatus comprising a packet delivery device, a packet receiving device, an accumulator having compartments for receiving and storing batches of packets, delivery conveyor means for feeding packets towards the accumulator, receiving conveyor means for feeding packets away from the accumulator, reversible drive means for moving successive compartments into a transfer position in alignment with the delivery conveyor means, the delivery conveyor means including at least one first conveyor and opposed means for pressing packets onto said conveyor to more positively engage packets for driving packets into and through a compartment at the transfer position, control means for releasing said pressing means at times other than when it is required to drive packets with said first conveyor through a compartment at the transfer position and at least one second conveyor for moving packets into and through a compartment at the transfer position during at least some of said times, said second conveyor comprising a pusher movable along a path which passes between said first conveyor and said pressing means and through said compartment at the transfer position, and said control means including means for operating said second conveyor so that said pusher passes completely through said compartment so that said compartment is cleared of packets during each loading and unloading sequence.

26. Packet handling apparatus comprising an accumulator having a plurality of compartments for receiving and storing batches of packets, means defining a delivery path on which packets are moved towards said accumulator, reversible drive means for moving successive compartments into a transfer position in alignment with said delivery path, means defining a receiving path on which packets are moved away from the accumulator, first and second conveying means, each being arranged to convey packets in a compartment at the transfer position, and control means for operating a selected one of said first and said second conveying means according to the operating condition of the accumulator, wherein said control means includes means for operating said second conveying means to remove all packets from the compartment before each operation of the reversible drive means and means for operating said second conveying means prior to each operation of said first conveying means to convey packets into a compartment at said transfer position for subsequent storage in said accumulator.

27. Apparatus as claimed in claim 26 in which said second conveying means includes at least one pusher movable through a compartment at the transfer position.

* * * * *